US007656282B2

(12) United States Patent (10) Patent No.: US 7,656,282 B2
Saitou et al. (45) Date of Patent: Feb. 2, 2010

(54) BATTERYLESS TIRE INFLATION PRESSURE DETECTING APPARATUS WITH IMPROVED POWER-SAVING CONFIGURATION

(75) Inventors: Takashi Saitou, Nishio (JP); Akira Takaoka, Okazaki (JP); Nobuya Watabe, Nagoya (JP); Hideki Saito, Anjo (JP); Tomohiro Kuno, Nagoya (JP)

(73) Assignees: Denso Corporation, Kariya, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 286 days.

(21) Appl. No.: 11/798,622

(22) Filed: May 15, 2007

(65) Prior Publication Data

US 2007/0262856 A1    Nov. 15, 2007

(30) Foreign Application Priority Data

May 15, 2006    (JP)    ............................. 2006-135065

(51) Int. Cl.
*B60C 23/00* (2006.01)
*B60C 23/02* (2006.01)
*B60Q 1/00* (2006.01)

(52) U.S. Cl. ....................... 340/442; 340/443; 340/444; 340/445; 340/446; 340/447; 340/448; 340/449; 73/146.2; 73/146.3; 73/146.4; 73/146.5

(58) Field of Classification Search ......... 340/442–449; 73/146.2–146.5
See application file for complete search history.

(56) References Cited

U.S. PATENT DOCUMENTS 6,430,484 B1 * 8/2002 Takamura et al. ............. 701/29

| 6,604,416 | B2 * | 8/2003 | Tsujita ....................... 73/146.5 |
| 6,727,810 | B1 * | 4/2004 | Martin et al. ................ 340/506 |
| 6,727,816 | B1 * | 4/2004 | Helgeson ..................... 340/540 |
| 6,922,142 | B2 * | 7/2005 | Norimatsu ................... 340/447 |
| 7,227,457 | B2 * | 6/2007 | Watabe ........................ 340/442 |
| 7,271,710 | B2 * | 9/2007 | Saitou et al. ................. 340/447 |
| 7,336,163 | B2 * | 2/2008 | Fujii ........................... 340/447 |
| 7,378,951 | B2 * | 5/2008 | Hagl et al. ................... 340/442 |
| 2005/0136843 | A1 | 6/2005 | Watabe |
| 2005/0156723 | A1 * | 7/2005 | Fujii ........................... 340/447 |
| 2005/0280523 | A1 | 12/2005 | Watabe |

FOREIGN PATENT DOCUMENTS

JP    2005-178562    7/2005
JP    2006-021746    1/2006

* cited by examiner

*Primary Examiner*—Benjamin C Lee
*Assistant Examiner*—Lam P Pham
(74) *Attorney, Agent, or Firm*—Nixon & Vanderhye PC

(57) ABSTRACT

A tire inflation pressure detecting apparatus includes a second transceiver provided on the body of a vehicle which changes its operation alternately between a second transmitter and a second receiver mode, thereby intermittently transmitting a radio wave. A first transceiver provided on a wheel of the vehicle operates in a first receiver mode to receive the radio wave, thereby charging a charging unit. When the charging unit has been sufficiently charged, the first transceiver changes operation thereof from the first receiver mode to a first transmitter mode, in which the first transceiver first repeatedly transmits an informing signal at predetermined time intervals for a predetermined time period and then transmits a pressure signal. When the informing signal is received by the second transceiver in the second receiver mode, the second transceiver keeps its operation in the second receiver mode until the pressure signal is completely received.

20 Claims, 10 Drawing Sheets

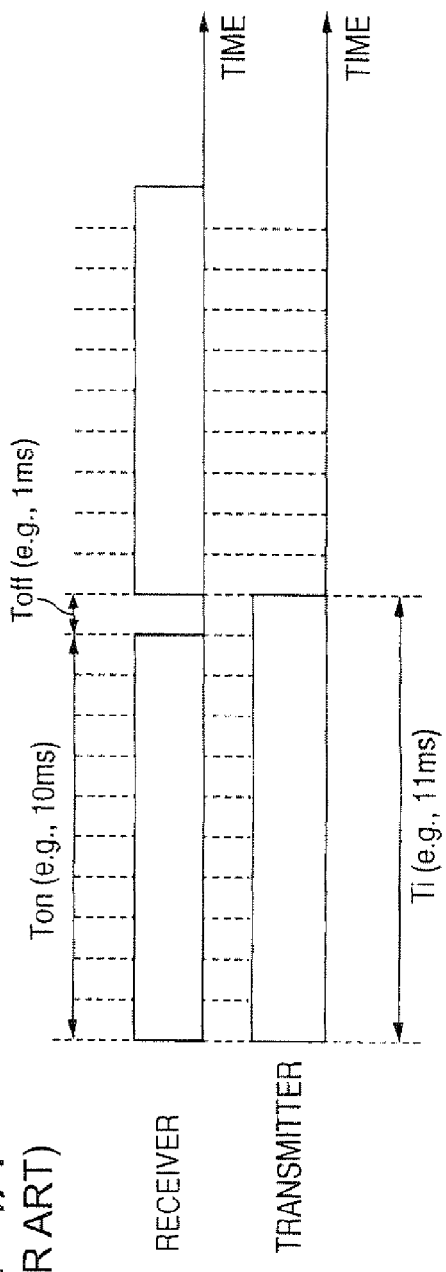
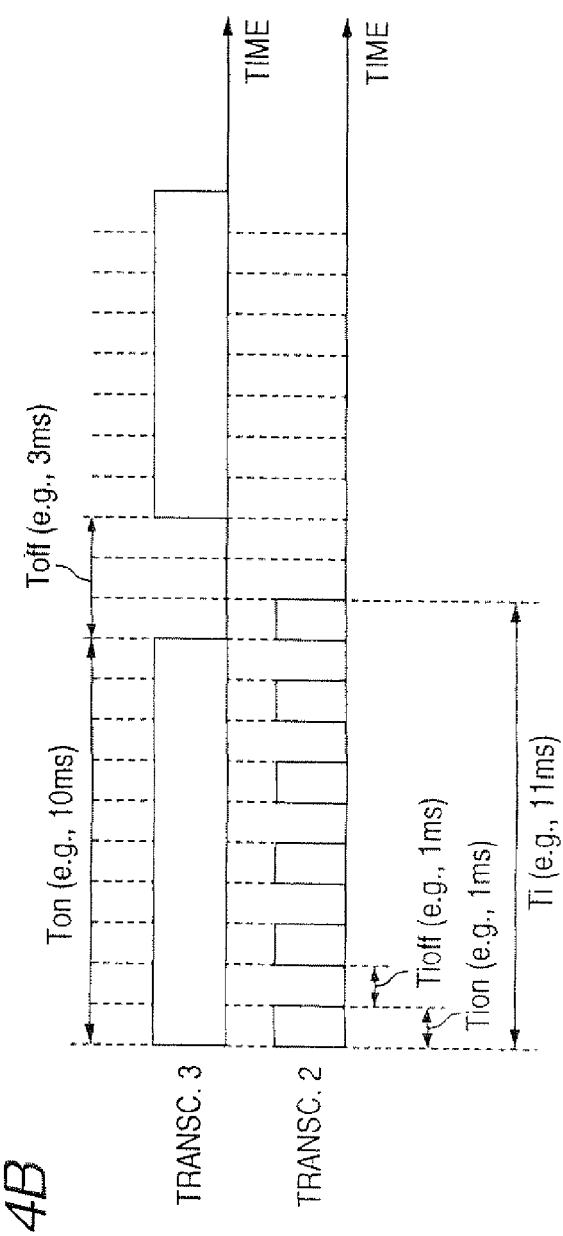
FIG. 4A (PRIOR ART)
FIG. 4B

BATTERYLESS TIRE INFLATION PRESSURE DETECTING APPARATUS WITH IMPROVED POWER-SAVING CONFIGURATION

CROSS-REFERENCE TO RELATED APPLICATION

This application is based on and claims priority from Japanese Patent Application No. 2006-135065, filed on May 15, 2006, the content of which is hereby incorporated by reference into this application.

BACKGROUND OF THE INVENTION

1. Technical Field of the Invention

The present invention relates generally to tire inflation pressure detecting apparatuses and wireless electric power charging systems. More particularly, the invention relates to a batteryless, direct-type tire inflation pressure detecting apparatus which is based on a transponder method and has an improved configuration for power saving.

2. Description of the Related Art

A conventional direct-type tire inflation pressure detecting apparatus for a vehicle generally includes at least one transmitter and a receiver.

The transmitter is directly installed to a wheel of the vehicle and includes a pressure sensor working to sense inflation pressure of a tire fitted on the wheel. The transmitter is configured to transmit a pressure signal indicative of the inflation pressure of the tire sensed by the pressure sensor.

The receiver is installed to the body of the vehicle and includes at least one antenna. The receiver is configured to receive, through the antenna, the pressure signal transmitted by the transmitter and determine the inflation pressure of the tire based on the received pressure signal.

In the above arrangement, the transmitter is conventionally supplied with electric power by a battery provided on the wheel of the vehicle. On the other hand, developments have recently been made to supply electric power to the transmitter without using a battery.

For example, U.S. Patent Application Publication No. 2005-0280523 discloses a batteryless tire inflation pressure detecting apparatus which is based on a transponder method.

According to the transponder method, the receiver (i.e., the interrogator) works to transmit, through the antenna thereof, a charge wave (i.e., a radio wave for electric power charge) to the transmitter, thereby charging a charging unit of the transmitter (i.e., the transponder). When the charging unit is completely charged with electric power, the transmitter is then activated by the charged electric power to transmit the pressure signal to the receiver.

However, in such a batteryless tire inflation pressure detecting apparatus, a charge-possible range of angular position of the transmitter, within which the level of the charge wave received by the transmitter is above a necessary level for charging the charging unit, is limited when the transmitter rotates together with the wheel.

Moreover, when the charge wave transmitted by the receiver and the pressure signal transmitted by the transmitter are at frequencies within the same frequency band, it is very difficult for the receiver to transmit the charge wave while receiving and accurately demodulating the pressure signal. Thus, it is necessary for the transmitter to transmit the pressure signal when the receiver stops transmitting the charge wave, so that the pressure signal and the charge wave can be prevented from being simultaneously transmitted.

In view of the above, in the batteryless tire inflation pressure detecting apparatus disclosed in the above patent document, the receiver is configured to perform a "packet charge" for the charging unit of the transmitter, during which operation of the receiver is changed alternately between an ON and an OFF mode.

More specifically, referring to FIG. 11, in the ON mode, the receiver transmits the charge wave without simultaneously receiving signals. On the other hand, in the OFF mode, the receiver stops transmitting the charge wave and is allowed to receive signals. Thus, through changing the operation thereof alternately between the ON and OFF modes, the receiver intermittently transmits the charge wave, thereby charging the charging unit of the transmitter.

When the charge voltage of the charging unit has increased to a predetermined level, the transmitter starts to transmit an informing signal a plurality of times continuously and then transmit the pressure signal. Here, the informing signal is a signal which is informative of that the pressure signal will be transmitted by the transmitter immediately after the signal. On the other hand, when the informing signal is first received by the receiver in the OFF mode, the receiver keeps the operation thereof in the OFF mode until the pressure signal following the informing signal is completely received by the receiver.

Further, to allow the receiver to reliably receive the informing signal, there is defined the relationship of $Ti \geq (Ton+Toff)$, where $Ti$ is the length of that time period for which the informing signal is continuously transmitted the plurality of times, $Ton$ is the length of each time period for which the receiver operates in the ON mode, and $Toff$ is the length of each time period for which the receiver operates in the OFF mode. In addition, $Toff$ is so set as to be not shorter than a time required for the receiver to receive and identify once the informing signal transmitted by the transmitter.

With the above configuration, however, the total time required for one transmission of the pressure signal is mostly spent on charging the charging unit of the transmitter, as shown in FIG. 11. Accordingly, to shorten the total time, it is desired to reduce the electric power consumption of the transmitter. However, when $Ti$ is shortened for the purpose of reducing the electric power consumption, it will be difficult for the receiver to reliably receive the informing signal.

SUMMARY OF THE INVENTION

The present invention has been made in view of the above-mentioned problems.

It is, therefore, a primary object of the present invention to provide a batteryless, direct-type tire inflation pressure detecting apparatus which is based on the transponder method and has an improved configuration that ensures reliable transmission of a charge wave and a pressure signal between a wheel-side transmitter (or transceiver) and a body-side receiver (or transceiver) and can significantly reduce the electric power consumption of the wheel-side transmitter (or transceiver).

According to the present invention, there is provided a tire inflation pressure detecting apparatus which includes a pressure sensor, a first transceiver, an electric power storage device, a second transceiver, and a pressure determiner.

The pressure sensor is provided on a wheel of a vehicle. The pressure sensor works to sense inflation pressure of a tire fitted on the wheel and generate a pressure signal representative of the sensed inflation pressure of the tire.

The first transceiver is provided on the wheel of the vehicle. The first transceiver is configured to selectively operate in a first receiver mode, in which the first transceiver is allowed to receive a radio wave, and a first transmitter mode in which the first receiver transmits both an informing signal and the pressure signal. The informing signal is informative of that the pressure signal is to be transmitted by the first transceiver following the informing signal.

The electric power storage device is provided on the wheel of the vehicle. The electric power storage device is configured to be charged with electric power, which is induced by the radio wave received by the first transceiver, and supply the electric power to both the pressure sensor and the first transceiver.

The second transceiver is provided on a body of the vehicle. The second transceiver is configured to selectively operate in a second transmitter mode, in which the second transceiver transmits the radio wave to the first transceiver, and a second receiver mode in which the second transceiver is allowed to receive both the informing signal and the pressure signal transmitted by the first transceiver.

The pressure determiner is provided on the body of the vehicle. The pressure determiner works to determine the inflation pressure of the tire based on the pressure signal received by the second transceiver.

Further, the tire inflation pressure detecting apparatus is so configured that:

the second transceiver changes operation thereof alternately between the second transmitter and second receiver modes, thereby intermittently transmitting the radio wave, the first transceiver operates in the first receiver mode to receive the radio wave intermittently transmitted by the second transceiver, when the electric power charged in the electric power storage device has reached a predetermined level, the first transceiver changes operation thereof from the first receiver mode to the first transmitter mode to transmit the informing signal and the pressure signal, and when the informing signal is received by the second transceiver in the second receiver mode, the second transceiver keeps the operation thereof in the second receiver mode until the pressure signal that follows the informing signal is completely received by the second transceiver.

Furthermore, in the tire inflation pressure detecting apparatus, the first transceiver is so configured that in the first transmitter mode, the first transceiver first repeatedly transmits the informing signal at predetermined time intervals for a predetermined time period and then transmits the pressure signal.

With the above configuration, it is possible to ensure reliable transmission of the radio wave and the pressure signal between the first and second transceivers.

Moreover, compared to the above-described conventional apparatus, the number of times the informing signal is transmitted is considerably reduced, thus significantly decreasing the power consumption of the first transceiver. As a result, the total time required for one transmission of the pressure signal is also significantly reduced.

In the tire inflation pressure detecting apparatus according to the present invention, the following relationship is preferably specified:

$$Ti \geq (Ton+Tr),$$

where Ti is a length of the predetermined time period for which the informing signal is repeatedly transmitted by the first transceiver at the predetermined time intervals, Ton is a length of each time period for which the second transceiver operates in the second transmitter mode to transmit the radio wave, and Tr is a time required for the second transceiver to receive and identify once the informing signal transmitted by the first transceiver.

Specifying the above relationship, it is possible for the second transceiver to reliably receive the informing signal in the second receiver mode.

In the tire inflation pressure detecting apparatus according to the present invention, the following relationship is preferably specified:

$$Toff \geq (2 \times Tion + Tioff),$$

where Toff is a length of each time period for which the second transceiver operates in the second receiver mode to wait for arrival of the informing signal and the tire pressure signal transmitted by the first transceiver, Tion is a time required for the first transceiver to transmit once the informing signal, and Tioff is a length of the predetermined time intervals for the repeated transmission of the informing signal.

Specifying the above relationship, it is possible for the second transceiver to reliably receive in the second receiver mode the informing signal at least once.

In the tire inflation pressure detecting apparatus according to the present invention, the second transceiver is preferably so configured as to modify one of Ton and Toff when the second transceiver has not received the informing signal for a time period during which it has changed the operation thereof alternately between the second transmitter and second receiver modes predetermined times.

With the above configuration, it is possible to prevent the charge time of the electric power storage device from becoming too long during rotation of the wheel.

In addition, the second transceiver may so modify Toff that a ratio between values of Toff after and before the modification is an integer.

The informing signal may be composed of a preset code, so that when the second transceiver receives in the second receiver mode a signal that contains the preset code, the second transceiver can identify the signal as being the informing signal.

The pressure sensor, the first transceiver, and the electric power storage device may be integrated into a single device on the wheel, and the second transceiver and the pressure determiner may be integrated into a single device on the body of the vehicle.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 4A is a time chart illustrating the continuously repeated transmission of an informing signal in a prior art tire inflation pressure detecting apparatus;

FIG. 4B is a time chart illustrating the discontinuously repeated transmission of an informing signal in the tire inflation pressure detecting apparatus according to the first embodiment of the invention;

DESCRIPTION OF THE PREFERRED EMBODIMENTS

Figure 1:
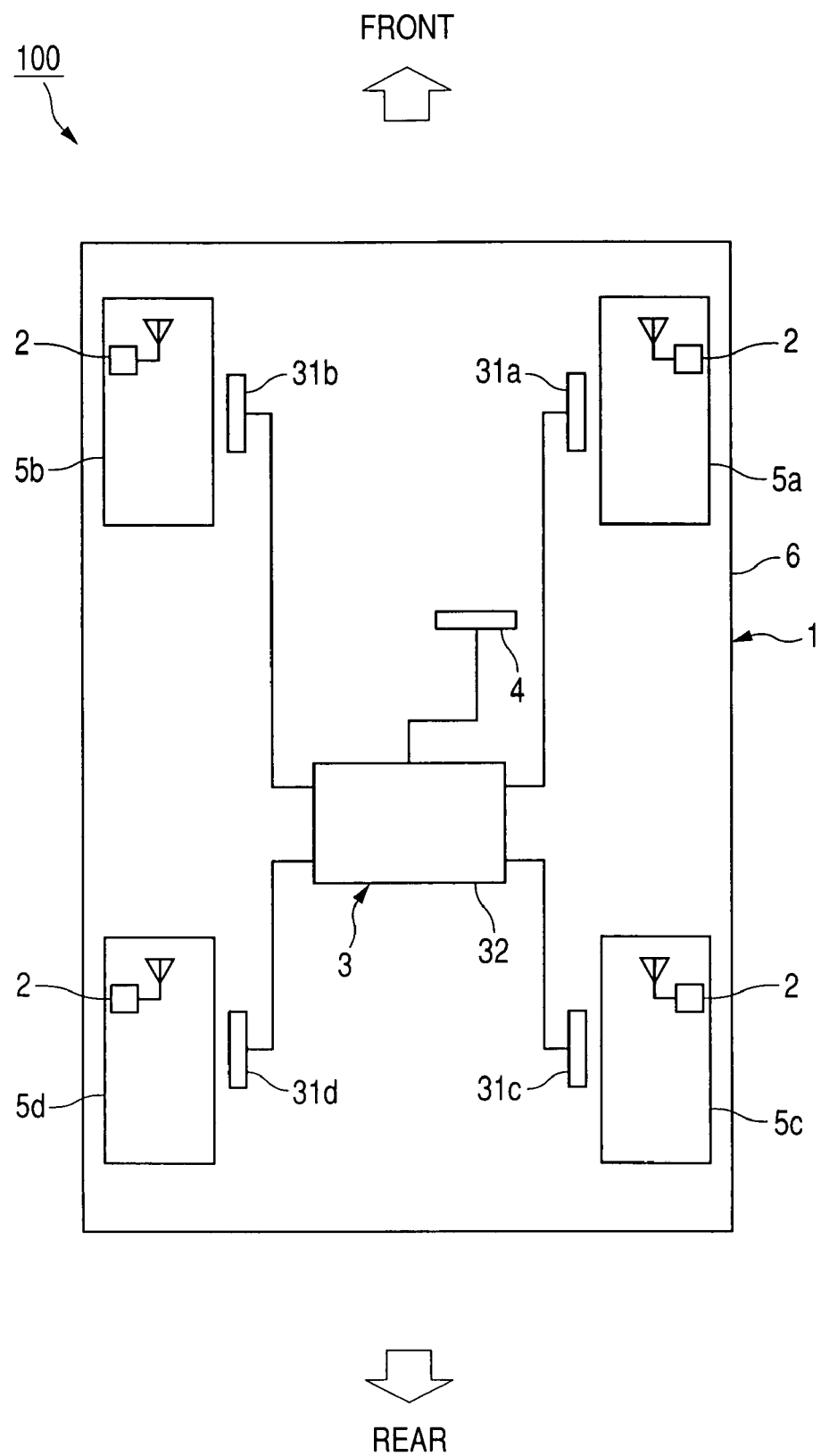
FIG. 1 is a schematic view showing the overall configuration of a tire inflation pressure detecting apparatus according to the first embodiment of the invention.

The preferred embodiments of the present invention will be described hereinafter with reference to FIGS. 1-10.

It should be noted that, for the sake of clarity and understanding, identical components having identical functions in different embodiments of the invention have been marked, where possible, with the same reference numerals in each of the figures.

First Embodiment

FIG. 1 shows the overall configuration of a batteryless, direct-type tire inflation pressure detecting apparatus 100 according to the first embodiment of the invention.

The tire inflation pressure detecting apparatus 100 is installed to a vehicle 1 which includes four wheels 5a-5d (i.e., the FR wheel 5a, the FL wheel 5b, the RR wheel 5c, and the RL wheel 5d).

As shown in FIG. 1, the tire inflation pressure detecting apparatus 100 includes four wheel-side transceivers 2, a body-side transceiver 3, and a warning device 4.

Figure 2:
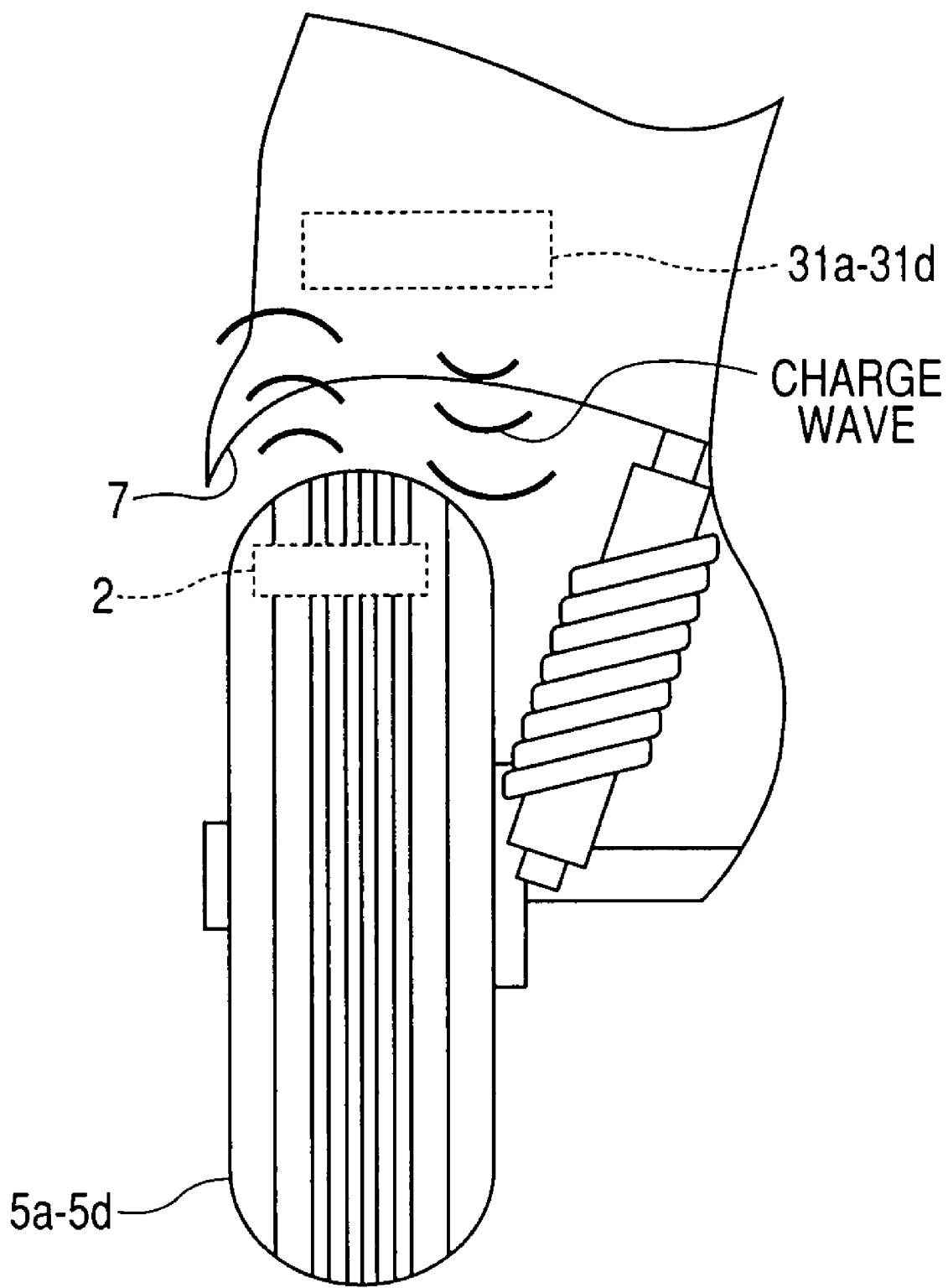
FIG. 2 is a schematic view illustrating the relative position between a wheel-side transceiver and a corresponding body-side antenna of the tire inflation pressure detecting apparatus on a vehicle.

Referring further to FIG. 2, each of the wheel-side transceivers 2 is mounted on a corresponding one of the four wheels 5a-5d of the vehicle 1, so as to have association with a tire fitted on the corresponding wheel.

Each of the wheel-side transceivers 2 works to sense the inflation pressure of the associated tire and transmit a frame that contains tire pressure information indicative of the sensed inflation pressure of the associated tire.

Further, according to the transponder method described above, each of the wheel-side transceivers 2 is configured to be charged with electric power via a charge wave (i.e., a radio wave for electric power charge) transmitted by the body-side transceiver 3 and be activated by the charged electric power.

On the other hand, the body-side transceiver 3 is mounted on the body 6 of the vehicle 1, as shown in FIG. 1. The body-side transceiver 3 includes four antennas 31a-31d and a microcomputer 32.

Each of the antennas 31a-31d is arranged on the body 6 of the vehicle 1 in the vicinity of a corresponding one of the wheels 5a-5d at a predetermined distance from the axis of the corresponding wheel. As shown in FIG. 2, in the present embodiment, each of the antennas 31a-31d is fixed to a corresponding one of fenders 7 of the vehicle 1.

As illustrated in FIG. 2, the body-side transceiver 3 works to transmit the charge wave to the wheel-side transceivers 2 via the corresponding antennas 31a-31d, receive the frames transmitted by the wheel-side transceivers 2 via the corresponding antennas 31a-31d, and determine the inflation pressures of the four tires based on the tire pressure information contained in the corresponding frames.

Figure 3A:
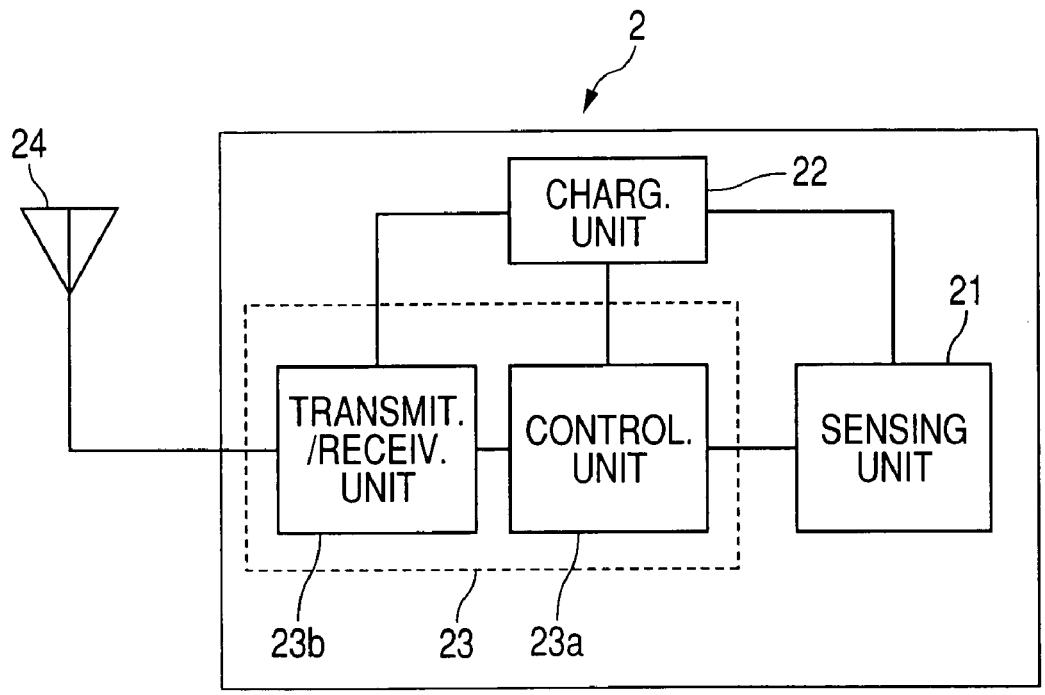
FIG. 3A is a functional block diagram showing the configuration of each of wheel-side transceivers of the tire inflation pressure detecting apparatus.

FIG. 3A shows the configuration of each of the wheel-side transceivers 2.

As shown in FIG. 3A, each of the wheel-side transceivers 2 includes a sensing unit 21, a charging unit 22, a microcomputer 23, and an antenna 24.

The sensing unit 21 is configured with sensors, such as a diaphragm-type pressure sensor and a temperature sensor, and works to output signals representative of the sensed inflation pressure of the tire and the sensed temperature of air within the tire.

The charging unit 22 is configured to be charged with electric power, which is induced by the charge wave received through the antenna 24, and supply the electric power to the sensing unit 21 and the microcomputer 23. The charging unit 22 may be made up of, for example, a capacitor.

The use of wireless electric power charging systems based on a transponder method is well known in the art, particularly in the field of wireless ID tags; therefore, more details thereabout are omitted hereinafter.

The microcomputer 23 is of a well-known type, which is configured with a CPU (Central Processing Unit), a ROM (READ Only Memory), a RAM (Random Access Memory), and I/O (Input/Output) devices.

The microcomputer 23 functionally includes a controlling unit 23a and a transmitting/receiving unit 23b, which are realized by a program installed in the ROM when the program is activated. The two units 23a and 23b are configured to implement predetermined processes in accordance with the program.

Specifically, the controlling unit 23a receives the signals output from the sensing unit 21 and processes those signals as needed. Then, the controlling unit 23a assembles the frame, which contains a plurality of identical preset codes and the tire pressure information indicative of the inflation pressure of the tire sensed by the sensing unit 21, and provides the frame to the transmitting/receiving unit 23b.

In the present embodiment, the preset code serves as an informing signal to inform the body-side transceiver 3 that the tire pressure information will be transmitted by the wheel-side transceiver 2 following the preset code. The preset code may be, for example, a simple binary code of "0101".

The transmitting/receiving unit 23b receives the charge wave through the antenna 24 and provides the received charge wave to the charging unit 22 and the controlling unit 23a. Further, the transmitting/receiving unit 23b receives the frame provided by the controlling unit 23a and transmits the frame to the body-side transceiver 3 through the antenna 24.

In the present embodiment, the process of transmitting the frame to the body-side transceiver 3 is started, in accordance with the program, when the charge voltage of the charging unit 22 has increased to a predetermined level necessary for the transmission of the frame.

Each of the above-described wheel-side transceivers 2 is fixed to an air valve of the corresponding one of the wheels 5a-5d and at least the sensing unit 21 thereof is arranged to be exposed to the air within the tire.

Figure 3B:
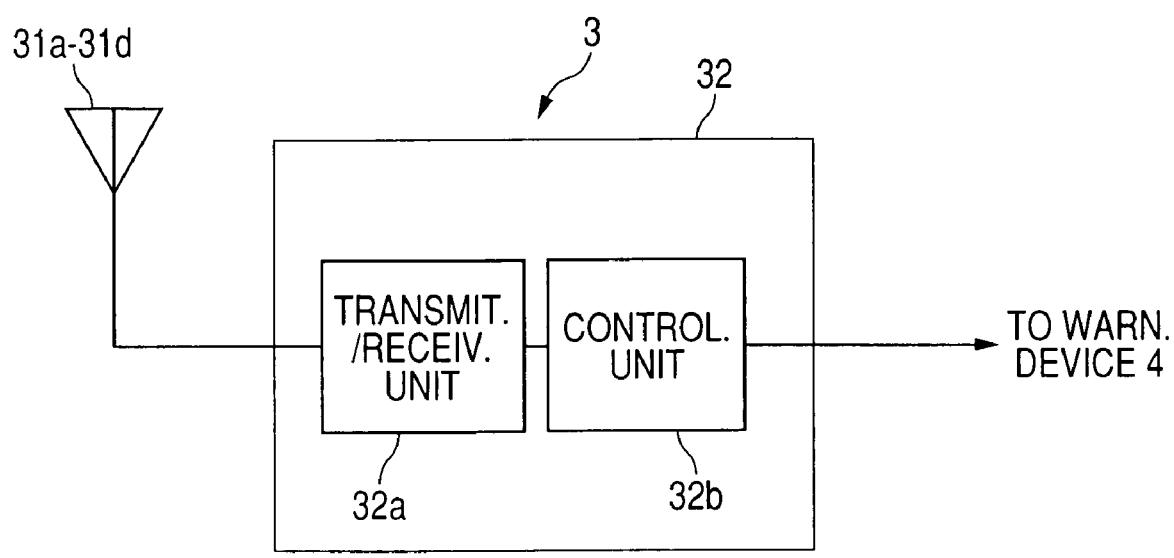
FIG. 3B is a functional block diagram showing the configuration of a body-side transceiver of the tire inflation pressure detecting apparatus.

FIG. 3B shows the configuration of the body-side transceiver 3. As mentioned previously, the body-side transceiver 3 includes the four antennas 31a-31d and the microcomputer 32.

In the present embodiment, each of the antennas 31a-31d functions as both a transmitting antenna for transmitting the charge wave to the corresponding wheel-side transceiver 2 and a receiving antenna for receiving the frame transmitted by the corresponding wheel-side transceiver 2.

The microcomputer 32 is of a well-known type, which is configured with a CPU, a ROM, a RAM, and I/O devices.

The microcomputer 32 functionally includes a transmitting/receiving unit 32a and a controlling unit 32b, which are realized by a program installed in the ROM of the microcomputer 32 when the program is activated. The two units 32a and 32b are configured to implement predetermined processes in accordance with the program.

Specifically, the transmitting/receiving unit 32a receives the charge wave from the controlling unit 32b and transmits the charge wave to the wheel-side transceivers 2 via the corresponding antennas 31a-31d.

The transmitting/receiving unit 32a also receives the frames from the wheel-side transceivers 2 via the corresponding antennas 31a-31d and provides the frames to the controlling unit 32b.

As to be described in detail later, the controlling unit 32b controls the transmitting/receiving unit 32a to transmit the charge wave without simultaneously receiving the frames transmitted by the wheel-side transceivers 2. Further, the controlling unit 32b controls the transmitting/receiving unit 32a to receive the frames transmitted by the wheel-side transceivers 2 without simultaneously transmitting the charge wave.

Moreover, the controlling unit 32b receives the frames provided by the transmitting/receiving unit 32a, and identifies the preset codes contained in the frames. Then, the controlling unit 32b determines the inflation pressures of the four tires based on the tire pressure information contained in the corresponding frames. After that, the controlling unit 32b compares each of the determined inflation pressures of the tires with a predefined threshold and outputs a warning signal to the warning device 4 if it is lower than the predefined threshold.

The warning device 4 is, as illustrated in FIG. 1, electrically connected to the body-side transceiver 3 and arranged in a location visible for the driver of the vehicle 1. The warning device 4 is configured with, for example, a warning display on the instrument panel of the vehicle 1. The warning device 4 works to inform, in response to receipt of the warning signal from the body-side transceiver 3, the driver of a decrease in the inflation pressures of the tires.

After having described the overall configuration of the tire inflation pressure detecting apparatus 100, operation thereof will be described hereinafter.

It should be noted that, for the sake of simplicity and easy understanding, the following description is mainly made on the basis of the communication between only one of the wheel-side transceivers 2 and the body-side transceiver 3.

FIG. 4A illustrates operation of the conventional tire inflation pressure detecting apparatus which is disclosed in U.S. Patent Application Publication No. 2005-0280523. On the other hand, FIG. 4B illustrates the operation of the tire inflation pressure detecting apparatus 100 according to the present embodiment.

As shown in FIG. 4A, in the conventional apparatus, the preset code, which is contained in a head portion of the frame and serves as the informing signal, is configured to be transmitted a plurality of times continuously.

For example, if Ti, which is the length of the time period for the continuously repeated transmission of the preset code, is set to 11 ms, and Tion, which is the time required for one transmission of the preset code, is 1 ms, then the number of times the preset code is transmitted for the time period of Ti is 11.

Further, to allow the receiver (i.e., the body-side transceiver 3) to reliably receive the preset code, Ti is required to be not shorter than (Ton+Toff), where Ton is the length of each time period for which the receiver operates in the ON mode, and Toff is the length of each time period for which the receiver operates in the OFF mode. In addition, Toff is required to be not shorter than the time required for the receiver to receive and identify once the preset code transmitted by the transmitter (i.e., the wheel-side transceiver 2).

For example, if the time required for the receiver to receive and identify once the preset code is 1 ms, then Toff may be set to 1 ms. Further, when the Ton is set to 10 ms, then Ti will accordingly be 11 ms.

However, with the above operation of the conventional apparatus, it is required to transmit the preset code as many as, for example, 11 times for only one transmission of the tire pressure information. Consequently, the transmitter (i.e., the wheel-side transceiver 2) consumes much electric power for one transmission of the tire pressure information, and thus the total time required for one transmission of the tire pressure information is accordingly long.

Referring now to FIG. 4B, in the tire inflation pressure detecting apparatus 100 according to the present embodiment, the body-side transceiver 3 is also configured to selectively operate in an ON-mode (i.e., a transmitter mode) and an OFF-mode (i.e., a receiver mode).

In the ON mode, the body-side transceiver 3 operates as a transmitter to transmit the charge wave without simultaneously receiving the frames transmitted by the wheel-side transceivers 2. On the contrary, in the OFF mode, the body-side transceiver 3 operates as a receiver to receive the frames without simultaneously transmitting the charge wave.

The body-side transceiver 3 changes the operation thereof alternately between the ON and OFF modes, thereby intermittently transmitting the charge wave to charge the charging units 22 of the wheel-side transceivers 2. Further, when the body-side transceiver 3 receives in the OFF mode the preset code transmitted by one of the wheel-side transceivers 2, it keeps the operation thereof in the OFF mode until the tire pressure information that follows the preset code is completely received thereby.

On the other hand, each of the wheel-side transceivers 2 is also configured to selectively operate in a receiver mode and a transmitter mode.

In the receiver mode, each of the wheel-side transceivers 2 operates as a receiver to receive the charge wave transmitted by the body-side transceiver 3, thereby charging the charging unit 22 thereof. On the contrary, in the transmitter mode, each of the wheel-side transceivers 2 operates as a transmitter to transmit the frame which contains the preset code serving as the informing signal and the tire pressure information indicative of the inflation pressure of the tire sensed by the sensing unit 21.

Each of the wheel-side transceivers 2 changes the operation thereof from the receive mode to the transmitter mode when the charge voltage of the charging unit 22 has reached the predetermined level necessary for the transmission of the frame.

Further, to allow the body-side transceiver 3 to reliably receive the preset code, Ti is so set as to be not shorter than (Ton+Tr), where Tr is the time required for the body-side transceiver 3 to receive and identify once the preset code.

For example, if Ton is set to 10 ms and Tr is 1 ms, then Ti may be set to 11 ms, as in the case of the conventional apparatus shown in FIG. 4A.

However, according to the present invention, each of the wheel-side transceivers 2 repeatedly transmits, in the transmitter mode, the preset code at predetermined time intervals (i.e., in a discontinuous manner) for the time period of Ti.

For example, if Tion, which is the time required for each of the wheel-side transceivers 2 to transmit once the preset code, is 1 ms, and Tioff, which is the length of the predetermined time intervals for the discontinuously repeated transmission of the preset code, is set to 1 ms, then the number of times the preset code is transmitted for the time period of Ti is 6.

Further, in the present embodiment, since the preset code is repeatedly transmitted in such a discontinuous manner, there is no guarantee that the start time of an OFF-mode period of the body-side transceiver 3 exactly coincides with that of a transmission of the preset code. Accordingly, to allow the body-side transceiver 3 to reliably receive at least once the preset code in the OFF-mode, Toff is preferably set to be not shorter than (2×Tion+Tioff).

For example, Toff may be set to be equal to (2×Tion+Tioff, so that it is 3 ms in FIG. 4B.

Moreover, Tioff may be set to any value subject to the processing capability of the controlling unit 23a of each of the wheel-side transceivers 2.

For example, in FIG. 4B, the ratio of Tion to Tioff is set to (1:1). However, the ratio may alternatively be set to (1:2) or (1:3).

It is easy to understand that with the same Ti, the number of times the preset code is transmitted decreases with increase in Tioff, thus decreasing the power consumption for one transmission of the tire pressure information.

For example, in FIG. 4B, the number of times the preset code is transmitted is equal to 6, with Ti being 11 ms and both Tion and Tioff being 1 ms. Consequently, compared to the case of the conventional apparatus shown in FIG. 4A, the power consumption for one transmission of the tire pressure information is decreased by about 45% (i.e., 5/11).

However, at the same time, when Tioff is increased for the purpose of decreasing the power consumption, Toff will accordingly increase, thus decreasing the ratio of Ton to Toff. As a result, the time required for completely charging the charging unit 22 of each of the wheel-side transceivers 2 will increase.

Accordingly, it is preferable to suitably set Tioff through a trade-off between the power consumption and the required charge time.

Figure 5:
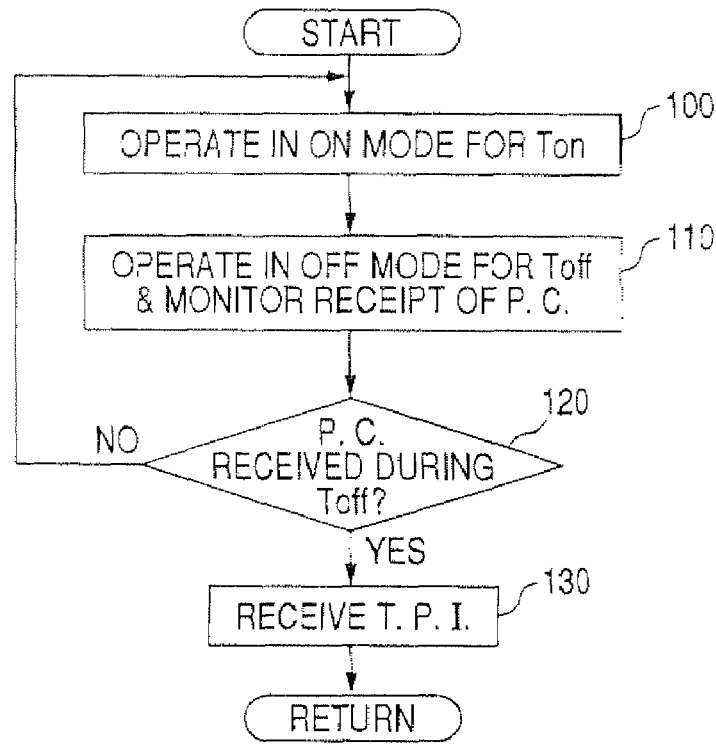
FIG. 5 is a flow chart showing a process of a controlling unit of the body-side transceiver according to the first embodiment of the invention.

FIG. 5 shows a process of the controlling unit 32b of the body-side transceiver 3 for controlling transmission of the charge wave.

This process is, for example, started when an ignition switch (not shown) of the vehicle 1 is turned from off to on, and terminated when the ignition switch is turned from on to off. In addition, this process is cyclically performed at predetermined time intervals.

First at the step 100, the controlling unit 32b controls the transmitting/receiving unit 32a to transmit the charge wave for a time period of Ton. In the other words, the controlling unit 32b controls the body-side transceiver 3 to operate in the ON mode for the time period of Ton.

At the step 110, the controlling 32b controls the transmitting/receiving unit 32a to stop the charge wave transmission for a time period of Toff. In other words, the controlling unit 32b controls the body-side transceiver 3 to operate in the OFF mode for the time period of Toff.

Further, at this step, the controlling unit 32b monitors whether there is the preset code (abbreviated to P. C. in FIG. 5) transmitted thereto from any of the wheel-side transceivers 2 via the transmitting/receiving unit 32a.

At the step 120, further steps of the process are selected.

More specifically, if the preset code transmitted by any of the wheel-side transceivers 2 is received and identified by the controlling unit 32b, then the process proceeds to the step 130.

Otherwise, if no preset code transmitted by any of the wheel-side transceivers 2 has been received and identified by the controlling unit 32b during the time period of Toff, then the process returns to the step 100.

At the step 130, the controlling unit 32b controls the transmitting/receiving unit 32a to receive the tire pressure information (Abbreviated to T. P. I. in FIG. 5) that follows the preset code. In other words, the controlling unit 32b keeps the operation of the body-side transceiver 3 in the OFF mode until the tire pressure information is completely received.

After that, the process goes to the end to complete the present cycle.

Figure 6:
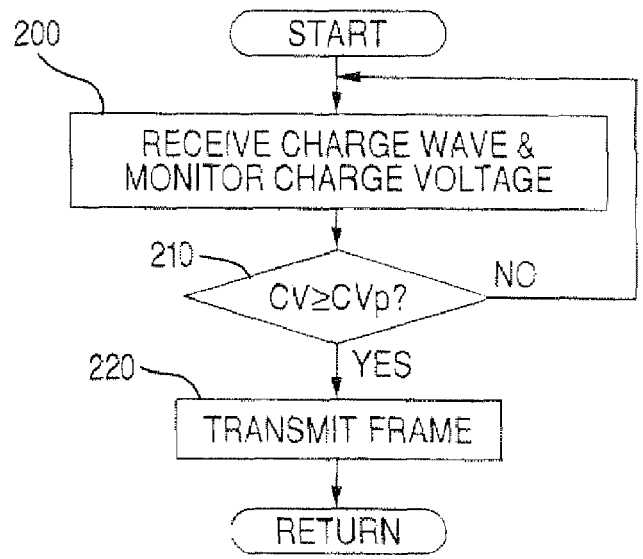
FIG. 6 is a flow chart showing a process of a controlling unit of each of the wheel-side transceivers according to the first embodiment of the invention.

FIG. 6 shows a process of the controlling unit 23a of each of the wheel-side transceivers 2 for controlling transmission of the frame.

First at the step 200, the controlling unit 23a controls the transmitting/receiving unit 23b to receive the charge wave transmitted by the body-side transceiver 3, thereby charging the charging unit 22. In other words, the controlling unit 23a controls the wheel-side transceiver 2 to operate in the receiver mode.

Further, at this step, the controlling unit 23a monitors the charge voltage of the charging unit 22.

At the step 210, further steps of the process are selected.

More specifically, if the charge voltage CV of the charging unit 22 is still lower than the predetermined level CVp necessary for the frame transmission, then the process returns to the step 200.

Otherwise, if the charge voltage CV of the charging unit 22 has reached the predetermined level CVp, then the process proceeds to the step 220.

At the step 220, the controlling unit 23a controls the transmitting/receiving unit 23b to transmit the frame. In other words, the controlling unit 23a changes the operation of the wheel-side transceiver 2 from the receiver mode to the transmitter mode.

Consequently, the preset code is first repeatedly transmitted at the predetermined time intervals of Tioff for the predetermined time period of Ti, and the tire pressure information is then transmitted following the preset code.

After that, the process goes to the end to complete the present cycle.

In addition, it is possible for the frame to further contain other information than the tire pressure information. For example, the frame may contain tire temperature information that indicates the temperature of air within the tire, so that the controlling unit 32b of the body-side transceiver 3 can perform, when necessary, temperature compensation for the determined inflation pressure of the tire. In this case, the tire temperature information may be transmitted following the tire pressure information.

To sum up, in the tire inflation pressure detecting apparatus 100 according to the present embodiment, each of the wheel-side transceivers 2 is configured to repeatedly transmit, in the transmitter mode, the preset code at the predetermined time intervals for the predetermined time period.

Consequently, compared to the conventional apparatus, the number of times the preset code is transmitted is considerably reduced, thus significantly decreasing the power consumption of each of the wheel-side transceivers 2 for one transmission of the tire pressure information. As a result, the total time required for one transmission of the tire pressure information is also significantly reduced.

Second Embodiment

This embodiment illustrates a process of the controlling unit 32b of the body-side transceiver 3 for controlling transmission of the charge wave, which is different from the process of the controlling unit 32b described in the first embodiment.

In the first embodiment, the process of the controlling unit 32b is devised on the assumption that the charge wave transmitted by the body-side transceiver 3 can always be reliably received by each of the wheel-side transceivers 2.

However, in practical uses, when each of the wheel-side transceivers 2 rotates together with the wheel, the charge-possible range of angular position of the wheel-side transceiver 2 is limited. The charge-possible range here denotes, as mentioned previously, a range of angular position of the wheel-side transceiver 2 within which the charge wave received by the wheel-side transceiver 2 is strong enough to charge the charging unit 22 thereof.

Figure 7B:
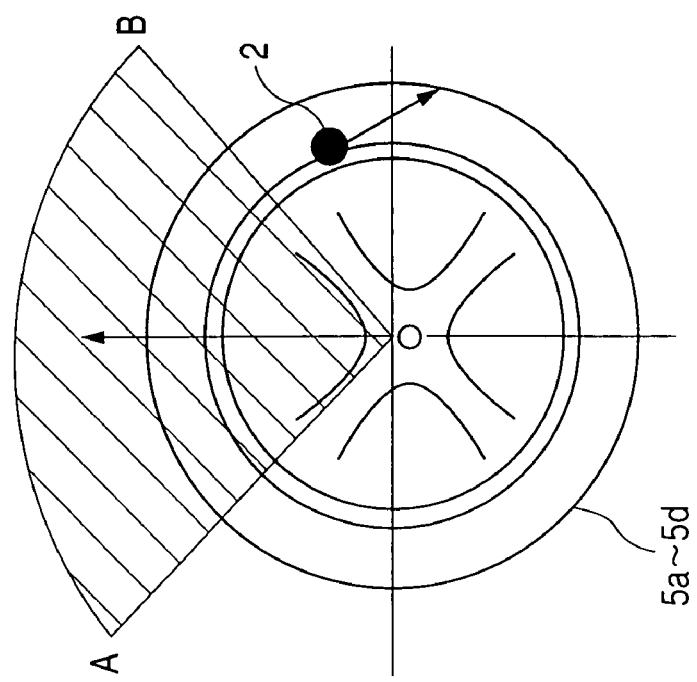
FIG. 7B is a time chart illustrating charge-possible time periods for each of the wheel-side transceivers during rotation of the wheel.
Figure 7A:
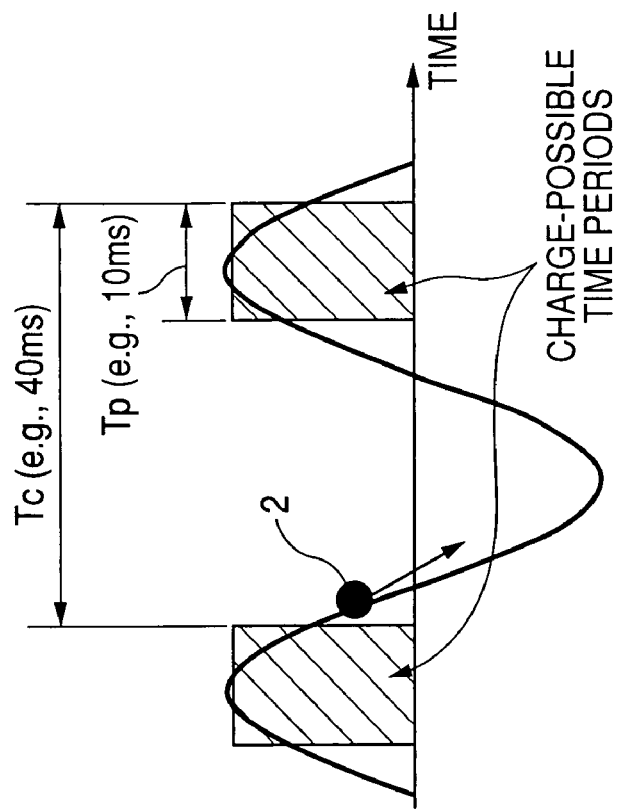
FIG. 7A is a schematic view illustrating the charge-possible range of each of the wheel-side transceivers.

More specifically, referring to FIG. 7A, the angular position of each of the wheel-side transceivers 2 changes when the wheel-side transceiver 2 rotates together with the wheel. The charge-possible range of each of the wheel-side transceivers 2 is represented in FIG. 7A by the hatched angular range A-O-B, which is about 90 degrees.

Accordingly, as shown in FIG. 7B, if the rotation cycle Tc of the wheel is, for example, 40 ms, then the length Tp of each charge-possible time period, during which the wheel-side transceiver 2 passes the charge-possible range, is only 10 ms (i.e., a quarter of the rotation cycle).

Figure 8:
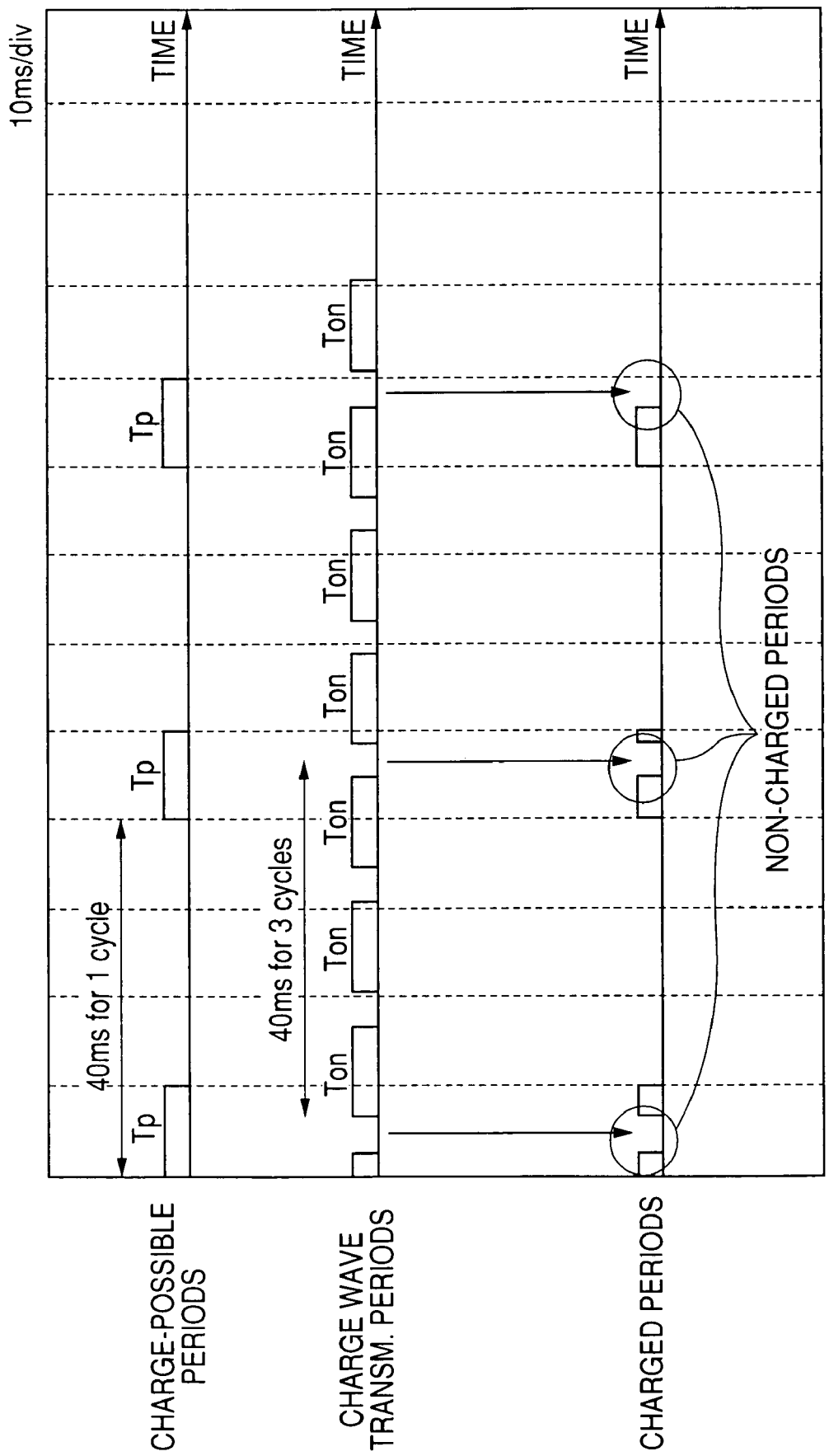
FIG. 8 is a time chart illustrating charge-impossible time periods for each of the wheel-side transceivers when the process of FIG. 5 is performed.

Thus, referring further to FIG. 8, the charge-possible time periods may partially overlap with the time periods during which the body-side transceiver 3 operates in the OFF mode. During the overlapping time periods, the wheel-side transceiver 2 cannot receive the charge wave transmitted by the body-side transceiver 3 and thus the charging unit 22 thereof cannot be charged with electric power. The overlapping time periods are indicated with a circle in FIG. 8 and to be referred to as non-charged time periods hereinafter.

Further, when the rotation cycle Tc of the wheel is an integer multiple (e.g., 3 in FIG. 8) of the cycle of change in the operation of the body-side transceiver 3, there are always kept such non-charged time periods.

In consideration of the above, in the present embodiment, the controlling unit 32b of the body-side transceiver 3 is configured to modify Toff when the body-side transceiver 3 cannot receive the frame transmitted by the wheel-side transceiver 2 though it has already changed the operation thereof alternately between the ON and OFF modes predetermined times Na. As described above, Toff is the length of each time period for which the body-side transceiver 3 operates in the OFF mode.

With the above configuration, it is possible to prevent the charge-possible time periods from overlapping with the time periods during which the body-side transceiver 3 operates in the OFF mode, thereby shortening the non-charged time periods.

Figure 9:
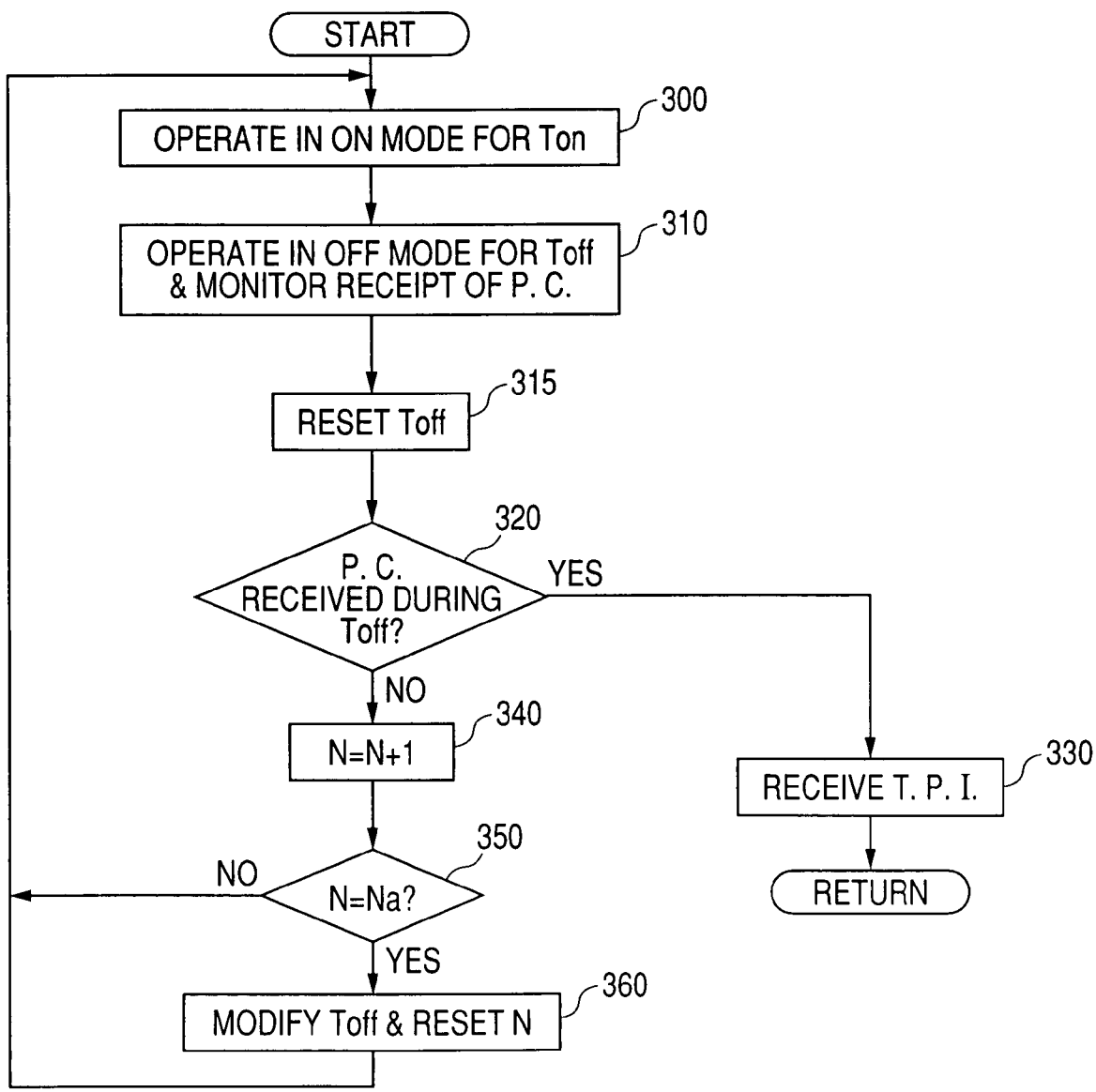
FIG. 9 is a flow chart showing a process of the controlling unit of the body-side transceiver according to the second embodiment of the invention.

FIG. 9 shows the process of the controlling unit 32b of the body-side transceiver 3 for controlling transmission of the charge wave according to the present embodiment.

First at the step 300, the controlling unit 32b controls the transmitting/receiving unit 32a to transmit the charge wave for a time period of Ton. In the other words, the controlling unit 32b controls the body-side transceiver 3 to operate in the ON mode for the time period of Ton.

At the step 310, the controlling 32b controls the transmitting/receiving unit 32a to stop the charge wave transmission for a time period of Toff. In other words, the controlling unit 32b controls the body-side transceiver 3 to operate in the OFF mode for the time period of Toff.

Further, at this step, the controlling unit 32b monitors whether there is the preset code (abbreviated to P. C. in FIG. 9) transmitted thereto from any of the wheel-side transceivers 2 via the transmitting/receiving unit 32a.

At the step 315, the controlling unit 32b resets Toff to an original value of, for example, 3 ms.

At the succeeding step 320, further steps of the process are selected.

More specifically, if the preset code transmitted by any of the wheel-side transceivers 2 is received and identified by the controlling unit 32b, then the process proceeds to the step 330.

At the step 330, the controlling unit 32b controls the transmitting/receiving unit 32a to receive the tire pressure information (Abbreviated to T. P. I. in FIG. 9) that follows the preset code. In other words, the controlling unit 32b keeps the operation of the body-side transceiver 3 in the OFF mode until the tire pressure information is completely received. After that, the process goes to the end to complete the present cycle.

Otherwise, at the step 320, if no preset code transmitted by any of the wheel-side transceivers 2 has been received and identified by the controlling unit 32b during the time period of Toff, then the process goes on to the step 340.

At the step 340, the controlling unit 32b increases a count number N by 1. Here, the count number N is used to count the number of times the body-side transceiver 3 has changed the operation thereof alternately between the ON and OFF modes and is originally set to zero.

At the step 350, the controlling unit 32b determines whether N has increased to the predetermined times Na.

If the determination at the step 350 produces a "NO" answer, then the process returns to the step 300.

Otherwise, if the determination at the step 350 produces a "YES" answer, then the process proceeds to the step 360.

At the step 360, the controlling unit 32b modifies, for example doubles, Toff, so that Toff is modified from the original value of 3 ms to 6 ms. After that, the process returns to the step 300 to repeat the above steps.

Figure 10:
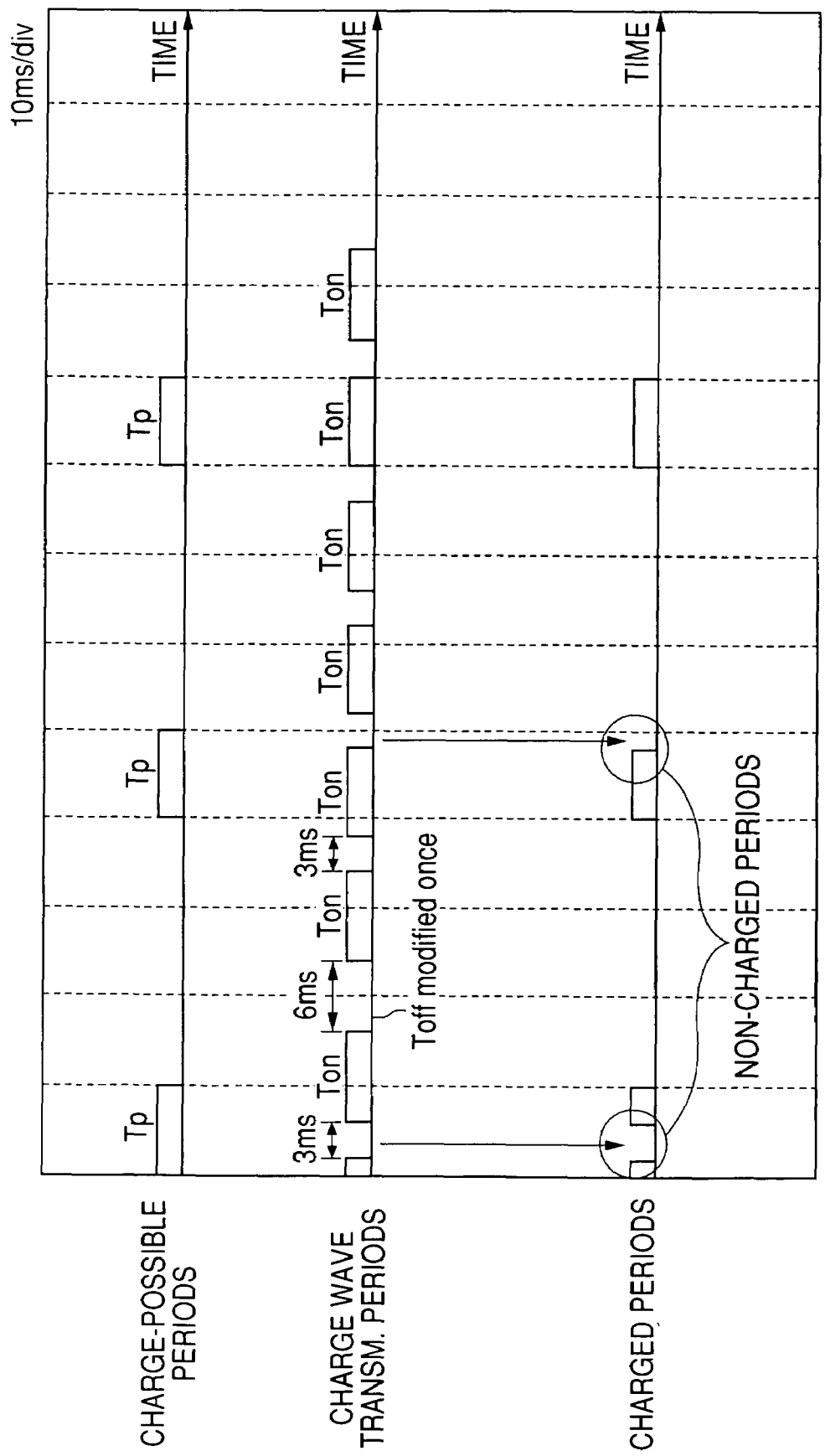
FIG. 10 is a time chart illustrating charge-impossible time periods for each of the wheel-side transceivers when the process of FIG. 9 is performed.
Figure 11:
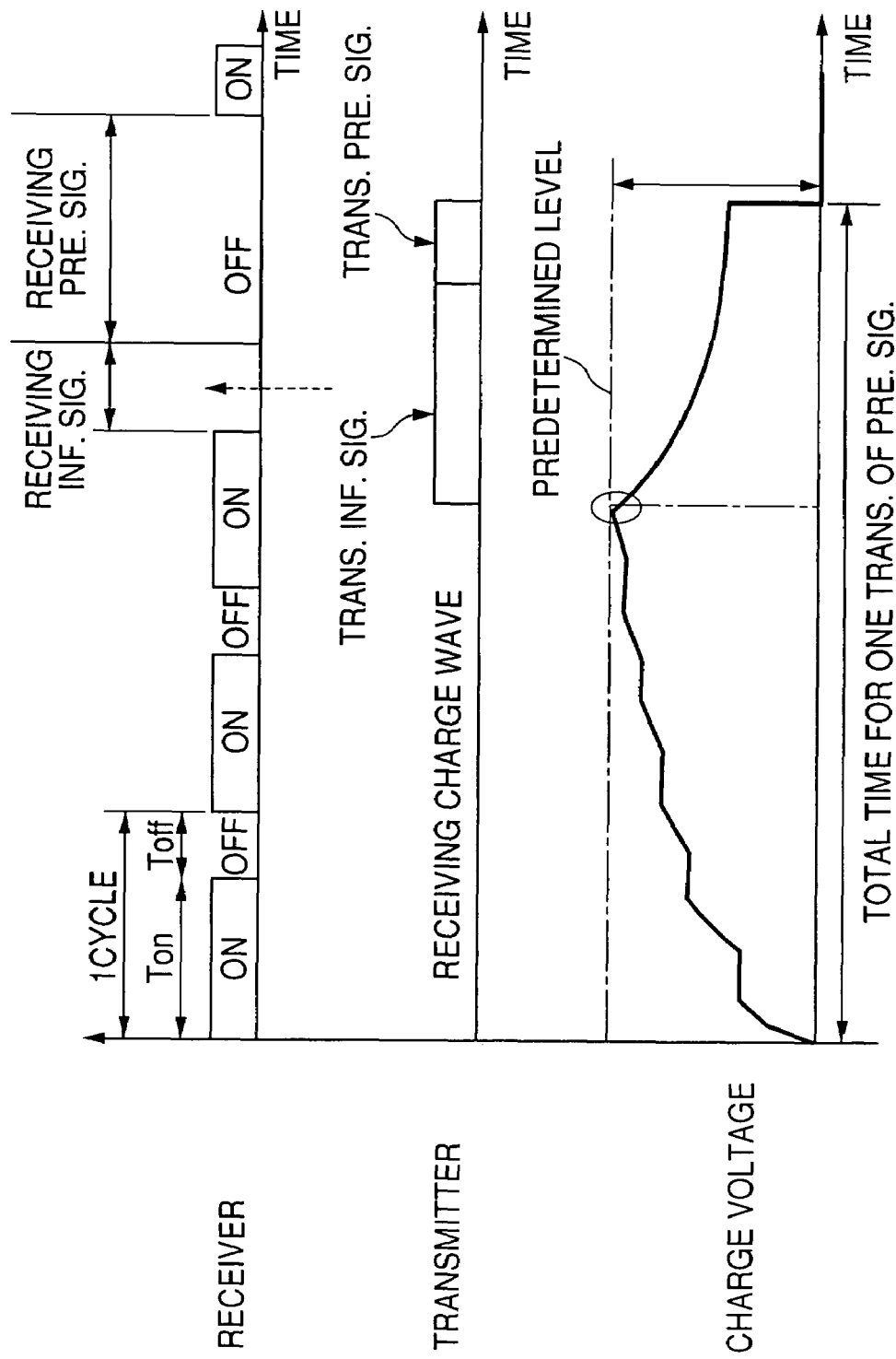
FIG. 11 is a time chart illustrating operation of the prior art tire inflation pressure detecting apparatus.

The effect of the above process may be understood more fully from FIG. 10. As shown in the figure, through modifying Toff from the original value of 3 ms to 6 ms, the non-charged time periods are considerably shortened. As a result, the total time required for one transmission of the tire pressure information will accordingly reduced.

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments, the body-side transceiver 3 is configured to include four antennas 31a-31d each of which corresponds to one of the four wheel-side transceivers 2. However, the body-side transceiver 3 may be configured to include only a common antenna which corresponds to all of the wheel-side transceivers 2.

Moreover, in the second embodiment, Toff is modified for the purpose of shortening the non-charged time periods. However, it is also possible to modify Ton, instead of Toff, for the same purpose.

Further, though Toff is modified only once in each cycle of the process of the controlling unit 32b, it is also possible to modify Toff a plurality of times in each cycle of the process.

Such modifications, changes, and improvements within the skill of the art are intended to be covered by the appended claims.

What is claimed is:

1. A tire inflation pressure detecting apparatus comprising:
    a pressure sensor provided on a wheel of a vehicle, the pressure sensor working to sense inflation pressure of a tire fitted on the wheel and generate a pressure signal representative of the sensed inflation pressure of the tire;
    a first transceiver provided on the wheel of the vehicle, the first transceiver being configured to selectively operate in a first receiver mode, in which the first transceiver is allowed to receive a radio wave, and a first transmitter mode in which the first transceiver transmits both an informing signal and the pressure signal, the informing signal being informative that the pressure signal is to be transmitted by the first transceiver following the informing signal;
    an electric power storage device provided on the wheel of the vehicle, the electric power storage device being configured to be charged with electric power, which is induced by the radio wave received by the first transceiver, and supply the electric power to both the pressure sensor and the first transceiver;
    a second transceiver provided on a body of the vehicle, the second transceiver being configured to selectively operate in a second transmitter mode, in which the second transceiver transmits the radio wave to the first transceiver, and a second receiver mode in which the second transceiver is allowed to receive both the informing signal and the pressure signal transmitted by the first transceiver;
    a pressure determiner provided on the body of the vehicle, the pressure determiner working to determine the inflation pressure of the tire based on the pressure signal received by the second transceiver,
    wherein
    the second transceiver changes operation thereof alternately between the second transmitter and second receiver modes, thereby intermittently transmitting the radio wave, the first transceiver operates in the first receiver mode to receive the radio wave intermittently transmitted by the second transceiver,
    when the electric power charged in the electric power storage device has reached a predetermined level, the first transceiver changes its operation from the first receiver mode to the first transmitter mode to transmit the informing signal and the pressure signal, and
    when the informing signal is received by the second transceiver in the second receiver mode, the second transceiver keeps its operation in the second receiver mode until the pressure signal that follows the informing signal is completely received by the second transceiver, and
    wherein in the first transmitter mode, the first transceiver repeatedly transmits in a discontinuous manner the informing signal at predetermined time intervals for a predetermined time period and then transmits the pressure signal.

2. The tire inflation pressure detecting apparatus as set forth in claim 1, wherein $$Ti \geq (Ton+Tr),$$

where Ti is a length of the predetermined time period for which the informing signal is repeatedly transmitted by the first transceiver at the predetermined time intervals, Ton is a length of each time period for which the second transceiver operates in the second transmitter mode to transmit the radio wave, and Tr is a time required for the second transceiver to receive and identify once the informing signal transmitted by the first transceiver.

3. The tire inflation pressure detecting apparatus as set forth in claim 2, wherein $$Toff \geq (2 \times Tion+Tioff,$$

where Toff is a length of each time period for which the second transceiver operates in the second receiver mode to wait for arrival of the informing signal and the tire pressure signal transmitted by the first transceiver, Tion is a time required for the first transceiver to transmit once the informing signal, and Tioff is a length of the predetermined time intervals for the discontinuously repeated transmission of the informing signal.

4. The tire inflation pressure detecting apparatus as set forth in claim 3, wherein when the second transceiver has not received the informing signal for a time period during which the second transceiver has changed the operation thereof alternately between the second transmitter and second receiver modes predetermined times, the second transceiver modifies one of Ton and Toff.

5. The tire inflation pressure detecting apparatus as set forth in claim 4, wherein the second transceiver modifies Toff so that a ratio between values of Toff after and before the modification is an integer.

6. The tire inflation pressure detecting apparatus as set forth in claim 1, wherein $$Toff \geq (2 \times Tion+Tioff,$$

where Toff is a length of each time period for which the second transceiver operates in the second receiver mode to wait for arrival of the informing signal and the tire pressure signal transmitted by the first transceiver, Tion is a time required for the first transceiver to transmit once the informing signal, and Tioff is a length of the predetermined time intervals for the discontinuously repeated transmission of the informing signal.

7. The tire inflation pressure detecting apparatus as set forth in claim 1, wherein when the second transceiver has not received the informing signal for a time period during which the second transceiver has changed the operation thereof alternately between the second transmitter and second receiver modes predetermined times, the second transceiver modifies one of Ton and Toff, where Ton is a length of each time period for which the second transceiver operates in the second transmitter mode to transmit the radio wave, and Toff is a length of each time period for which the second transceiver operates in the second receiver mode to wait for arrival of the informing signal and the tire pressure signal transmitted by the first transceiver.

8. The tire inflation pressure detecting apparatus as set forth in claim 7, wherein the second transceiver modifies Toff so that a ratio between values of Toff after and before the modification is an integer.

9. The tire inflation pressure detecting apparatus as set forth in claim 1, wherein the informing signal is composed of a preset code, and wherein when the second transceiver receives in the second receiver mode a signal that contains the preset code, the second transceiver identifies the signal as being the informing signal.

10. The tire inflation pressure detecting apparatus as set forth in claim 1, wherein the pressure sensor, the first transceiver, and the electric power storage device are integrated into a single device on the wheel, while the second transceiver and the pressure determiner are integrated into a single device on the body of the vehicle.

11. A method of detecting vehicle tire inflation pressure using:
 (a) a pressure sensor mounted on a vehicle wheel sensing tire inflation pressure and generating a tire inflation pressure signal in conjunction with a wheel-mounted transceiver selectively operating in a first receiver mode to receive a radio wave and a first transmitter mode to transmit data representing both an informing signal and the pressure signal, the informing signal indicating that the pressure signal is to be transmitted thereafter and an electric power storage device configured to be charged with electric power induced by the received radio wave and to supply electric power to both the pressure sensor and the wheel-mounted transceiver; and
 (b) a vehicle body-mounted transceiver configured to selectively operate in a second transmitter mode transmitting the radio wave to the wheel-mounted transceiver and in a second receiver mode receiving both the informing signal and the pressure signal data transmitted by the wheel-mounted transceiver in conjunction with means provided on the body of the vehicle to determine the inflation pressure of the tire based on the received pressure signal data;
 said method comprising:
 changing operation of the vehicle-mounted transceiver alternately between the second transmitter and second receiver modes, thereby intermittently transmitting the radio wave,
 operating the wheel-mounted transceiver in the first receiver mode to receive the radio wave intermittently transmitted by the vehicle-mounted transceiver;
 when the electric power charged into the electric power storage device has reached a predetermined level, changing operation of the wheel-mounted transceiver from the first receiver mode to the first transmitter mode and transmitting data representing the informing signal and the pressure signal, the informing signal data being repeatedly transmitted at discontinuous predetermined time intervals for a predetermined time period; and
 when the informing signal is successfully received by the vehicle-mounted transceiver in the second receiver mode, maintaining the second receiver mode until the pressure signal data that follows the informing signal data is completely received.

12. The tire inflation pressure detecting method as set forth in claim 11, wherein:

$$Ti \geq (Ton+Tr),$$

where Ti is a length of the predetermined time period for which the informing signal is repeatedly transmitted at the predetermined time intervals, Ton is a length of each time period for which the second transmitter mode is used to transmit the radio wave, and Tr is a time required to receive and identify once the received informing signal.

13. The tire inflation pressure detecting method as set forth in claim 12, wherein $$Toff \geq (2 \times Tion+Tioff),$$

where Toff is a length of each time period for which the second receiver mode is effected to wait for arrival of the informing signal and the tire pressure signal, Tion is a time required to transmit once the informing signal, and Tioff is a length of the predetermined time intervals for the discontinuously repeated transmission of the informing signal.

14. The tire inflation pressure detecting method as set forth in claim 13, wherein when the informing signal has not been received for a time period during which the vehicle-mounted transceiver has changed its operation alternately between the second transmitter and second receiver modes a predetermined number of times, one of Ton and Toff is modified.

15. The tire inflation pressure detecting method as set forth in claim 14, wherein Toff is modified so that a ratio between values of Toff after and before the modification is an integer.

16. The tire inflation pressure detecting method as set forth in claim 11, wherein $$Toff \geq (2 \times Tion+Tioff),$$

where Toff is a length of each time period tor which the second receiver mode is effected to wait for arrival of the informing signal data and the tire pressure signal data, Tion is a time required to transmit once the informing signal, and Tioff is a length of the predetermined time intervals for the discontinuously repeated transmission of the informing signal.

17. The tire inflation pressure detecting method as set forth in claim 11, wherein when the informing signal has not been received for a time period during which the vehicle-mounted transceiver has changed its operation alternately between the second transmitter and second receiver modes a predetermined number of times, one of Ton and Toff is modified, where Ton is a length of each time period for which the second transmitter mode is effected to transmit the radio wave, and Toff is a length of each time period for which the second receiver mode is effected to wait for arrival of the informing signal data and the tire pressure signal data.

18. The tire inflation pressure detecting method as set forth in claim 17, wherein Toff is modified so that a ratio between values of Toff after and before the modification is an integer.

19. The tire inflation pressure detecting method as set forth in claim 11, wherein the informing signal is composed of a preset code and wherein during the second receiver mode, a signal is received that contains the preset code and the vehicle-mounted transceiver identifies the signal as being the informing signal.

20. The tire inflation pressure detecting method as set forth in claim 11, wherein the pressure sensor, the wheel-mounted transceiver and the electric power storage device are integrated into a single device on the wheel, while the vehicle-mounted transceiver and means for determining pressure are integrated into a single device on the vehicle body.

* * * * *